(12) United States Patent
Abe

(10) Patent No.: US 11,086,543 B2
(45) Date of Patent: Aug. 10, 2021

(54) DATA PRESERVATION IN LINEAR TAPE FILE SYSTEMS

(71) Applicant: International Business Machines Corporation, Armonk, NY (US)

(72) Inventor: Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/701,250

(22) Filed: Dec. 3, 2019

(65) Prior Publication Data

US 2021/0165591 A1 Jun. 3, 2021

(51) Int. Cl.
*G06F 3/06* (2006.01)

(52) U.S. Cl.
CPC ............ *G06F 3/0644* (2013.01); *G06F 3/064* (2013.01); *G06F 3/0608* (2013.01); *G06F 3/0656* (2013.01); *G06F 3/0659* (2013.01); *G06F 3/0686* (2013.01)

(58) Field of Classification Search
CPC ..................................... G06F 3/0644
USPC ......................................... 711/154
See application file for complete search history.

(56) References Cited

U.S. PATENT DOCUMENTS 9,606,740 B2    3/2017  Klein
2012/0179868 A1*  7/2012  Haustein ............... G06F 3/0682
                                                    711/111

FOREIGN PATENT DOCUMENTS

JP          2001051883 A      2/2001

* cited by examiner

*Primary Examiner* — Jae U Yu
(74) *Attorney, Agent, or Firm* — Alexander G. Tochym

(57) ABSTRACT

A data to write to a tape in a linear tape file system (LTFS) is received. The data is written to the tape. A forced termination of the write is received. Responsive to receiving the forced termination, a preserve metadata command is issued.

17 Claims, 4 Drawing Sheets

DATA PRESERVATION IN LINEAR TAPE FILE SYSTEMS

BACKGROUND

The present invention relates generally to the field of linear tape file systems, and more particularly to preserving data in a linear tape file system.

A linear tape file system (LTFS) is a standard that defines the organization of data and metadata on a magnetic tape data storage. This provides ease of access to data on the tapes along with the option for drag and drop of data similar to a hard disk drive. A LTFS has a tape drive for storage that provides two partitions generally. The first partition of the tape holds directory structures and pointers that allows the tape drive to easily and quickly access data on the tape. The second partition of the tape is where the actual data itself is stored.

In a LTFS, data is stored at the end of the tape. In other words, the new data is stored, linearly, after the last piece of data that was stored. Here, if a file is modified or removed from the tape, the blocks the data was stored are not freed up but are marked as unavailable and used volume capacity is not recovered. The only way to recover the space on the tape is to reformat the entire tape.

SUMMARY

Embodiments of the present invention include a method, computer program product, and system for delegating control of a vehicle. In one embodiment, a data to write to a tape in a linear tape file system (LTFS) is received. The data is written to the tape. A forced termination of the write is received. Responsive to receiving the forced termination, a preserve metadata command is issued.

DETAILED DESCRIPTION

When data is written to a media library and specifically written to a tape in a tape drive of the media library, the data is written as one or more data partitions and an index partition. When a forced termination of the data transfer occurs before the data transfer is complete, data may be inaccessible on the tape. This may occur in situations where the data partition is not completely written and/or the index partition is not completely written. In these cases, the media library manages the tape by going back to the last index partition and beginning to write the new data that has not had an index partition placed after it on the tape.

Embodiments of the present invention provide for a way to not have to "lose" or "overwrite" a data partition that was already at least partially written, but an index partition was not written. Embodiments of the present invention provide for the use of a memory buffer in the tape drive so that time/resources are not wasted rewriting data that has already been written to the tape.

Figure 1:
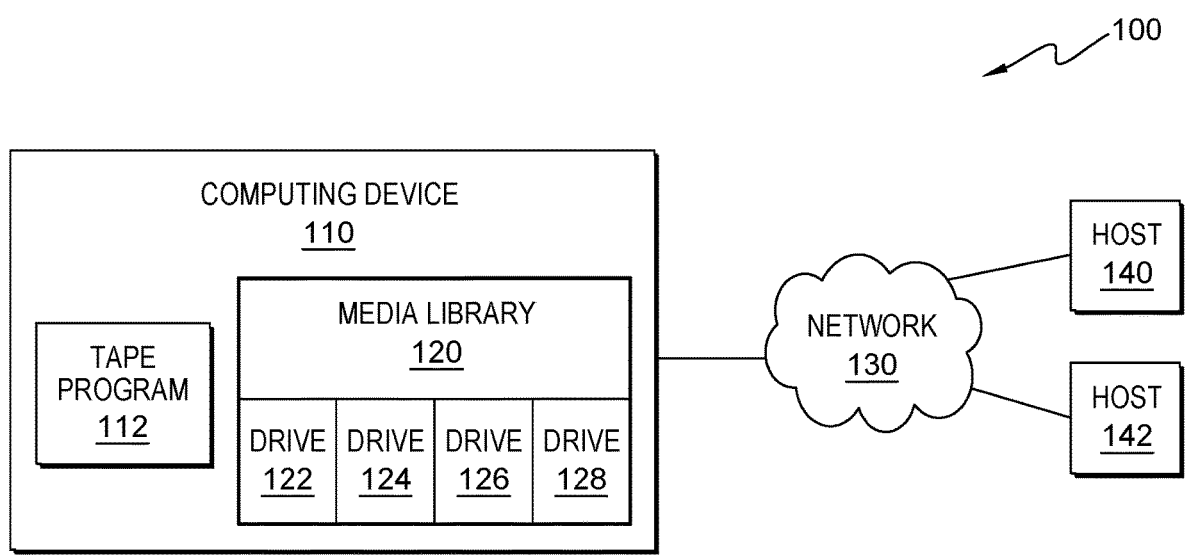
FIG. 1 is a functional block diagram of a network computing environment, generally designated 100, suitable for operation of tape program 112, in accordance with at least one embodiment of the invention.

Referring now to various embodiments of the invention in more detail, FIG. 1 is a functional block diagram of a network computing environment, generally designated 100, suitable for operation of tape program 112 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110, host 140, and host 142 interconnected over network 130. In embodiments of the present invention, network 130 can be a telecommunications network, a local area network (LAN), a wide area network (WAN), such as the Internet, or a combination of the three, and can include wired, wireless, or fiber optic connections. Network 130 may include one or more wired and/or wireless networks that are capable of receiving and transmitting data, voice, and/or video signals, including multimedia signals that include voice, data, and video formation. In general, network 130 may be any combination of connections and protocols that will support communications between computing device 110, host 140, host 142, and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100 via a network, such as network 130.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g. database server computers, application server computers, web servers, and media servers) that act as a single pool of seamless resources when accessed within network computing environment 100.

In various embodiments of the invention, computing device 110 includes tape program 112 and media library 120.

In an embodiment, computing device 110 includes tape program 112. Embodiments of the present invention provide for a tape program 112 that receives data from a host to be written to a tape. In embodiments of the present invention, tape program 112 receives the data. In embodiments of the present invention, tape program 112 writes the data to the tape in a tape drive 122, 124, 126, 128 of tape library 12. In embodiments of the present invention, tape program 112 determines if a force termination occurs. In embodiments of the present invention, tape program 112 preserves metadata if a force termination occurs. In embodiments of the present invention, tape program 112 determines if the write is complete if a forced termination has not occurred. In embodiments of the present invention, tape program 112 clears metadata if the write is complete. In embodiments of the present invention, tape program 112 continues to write data if the write is not complete. In embodiments of the present invention, tape program 112 receives an indication that a tape has been loaded into a tape drive. In embodiments of the present invention, tape program 112 determines if metadata exists in the memory buffer of the tape drive. In embodiments of the present invention, tape program 112 continues a standard operation for writing data to a tape if metadata does not exist. In embodiments of the present invention, tape program 112 determines tape data found on the tape loaded into the tape drive if metadata exists in the memory buffer of the tape drive. In embodiments of the present invention, tape program 112 merges the metadata in the memory buffer with the data on the tape. In embodiments of the present invention, tape program 112 writes the remaining data to the tape.

Embodiments of the present invention provide for a new small computer system interface (SCSI) command known as "PRESERVE_META" and "CLEAR_META" to be utilized by tape program 112. In an embodiment, the "PRESERVE_META" command causes transfer of the data from the host to the tape drive so that the tape drive stores the transferred data in a metadata buffer within the tape drive. In an embodiment, if the metadata buffer within the tape drive has data already, the transferred data is appended at the end of the metadata buffer. In an embodiment, if the metadata buffer does not have enough space for the transferred data, an error is returned. In an embodiment, the "CLEAR_META" command causes the erasing of data stored in the metadata buffer within the tape drive.

In an embodiment, computing device 110 includes media library 120. In an embodiment, media library 120 may comprise of a tape library, such as drive 122, 124, 126, and 128. In an alternative embodiment, there may be any number of drives with any number of tapes. In an embodiment, the tapes are accessible to media library 120 via any of drive 122, 124, 126, and 128. In an embodiment, media library 120, also known as a tape library, as would be understood by one of ordinary skill in the art, typically consists of one or more tape drives, such as drive 122, 124, 126, and 128. In an embodiment, drive 122, 124, 126, and 128 can read/write data to/from magnetic tape. In an embodiment, drive 122, 124, 126, and 128 each have their own buffer to facilitate writing from computer device 110 to the tape loaded into the specific drive. In an embodiment, a magnetic tape is contained within cartridges also referred to herein as tapes or tape cartridges. In an embodiment, a series of slots stores the tapes when they are not in use (i.e. in a drive 122, 124, 126, and 128). In an embodiment, one or more robots may move a tape between any of the drives and storage slots. In an embodiment, media library 120 may be modular in nature, allowing for one or more media library 120 that include any number of drives. In an embodiment, media library 120 may be a physical or a virtual representation that can be presented as a single medial library 120 that is considered for the purposes of this application. In an alternative embodiment, media library 120 may be a device separate to computing device 110 connected via network 130.

Host 140 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, host 140 represents any programmable electronic devices or combination of programmable electronic devices capable of executing machine readable program instructions and communicating with other computing devices (not shown) within computing environment 100 via a network, such as network 130. In an embodiment, host 140 transfers data to computing device 110 in order to have the data stored on a tape using media library 120. In an embodiment, host 142 is substantially similar to host 140.

In various embodiments of the invention, host 140 may be a computing device that can be a standalone device, a management server, a web server, a media server, a mobile computing device, or any other programmable electronic device or computing system capable of receiving, sending, and processing data. In other embodiments, host 140 represents a server computing system utilizing multiple computers as a server system, such as in a cloud computing environment. In an embodiment, host 140 represents a computing system utilizing clustered computers and components (e.g. database server computers, application server computers, web servers, and media servers) that act as a single pool of seamless resources when accessed within network computing environment 100.

[Host 140 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

Figure 2:
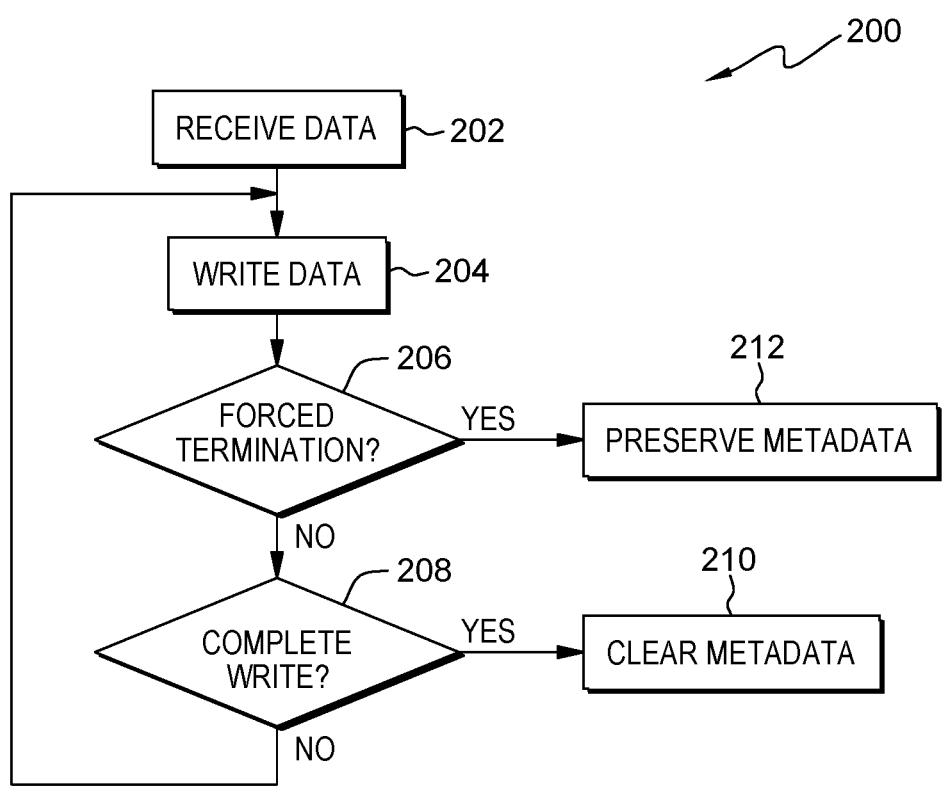
FIG. 2 is a flow chart diagram depicting operational steps for tape program 112, in accordance with at least one embodiment of the invention.

FIG. 2 is a flow chart diagram of workflow 200 depicting operational steps for tape program 112 in accordance with at least one embodiment of the invention. In an alternative embodiment, the steps of workflow 200 may be performed by any other program while working with tape program 112. It should be appreciated that embodiments of the present invention provide at least for interacting with a tape drive, including but not limited to, writing index partition and data partition information. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via user interface (not shown) of either host 140, host 142, or computer device 110, can invoke workflow 200 upon a user wanting tape program 112 to modify data on a tape in utilizing media library 120 of computing device 110.

Tape program 112 receives data (step 202). At step 202, a user, via host 140 or host 142, transfers data to computing device 110 via network 130. The user indicates to tape program 112 that the data should be written to media library 120. In an alternative embodiment, the data may already be located on computing device and the user, via host 140 or host 142, indicates to tape program 112 the data should be written to media library 120. In yet another alternative embodiment, the user via host 140 or host 142, may indicate that data found on a tape in media library 120 should be written on another tape in media library 120. In yet another alternative embodiment, the user, via a user interface (not shown) on computer device 110 may indicate that data should be written to a tape in media library 120.

Tape program 112 writes the data (step 204). At step 204, tape program 112 writes the data received in step 202 to a tape found in a drive (e.g., drive 122, 124, 126, 128) of media library 120. In an embodiment, tape program 112 may write to a tape in a tape drive specifically indicated by the user in step 202. In an alternative embodiment, tape program 112 may work with another program (not shown) of media library 120 that determines the proper tape and/or tape drive to write to. As tape program 112 writes the data to, for example, a tape found in tape drive 122, the data is stored in a buffer before writing to the tape. In an embodiment, the buffer may be found directly on tape drive 122. In an alternative embodiment, the buffer may be found on media library 120 and associated with tape drive 122. As the data is transferred from to the media library 120 and subsequently to the buffer, the data is then written to the tape. For example, a tape in tape drive 122. In an embodiment, the data is written to the buffer and the tape, subsequently, in parts of the original data. When the data partition is confirmed to be written to the tape and the related index partition is written, the written data partition clears from the buffer in order for a new data partition to be written to the buffer. In an embodiment, tape program 112 issues a command, such as "PRESERVE_META" that notify media library 120 to have the tape drive, in this case tape drive 122, to store the data partition received in its buffer until the data partition and related index partition is written, or in the case of unwritten data, a command is issued, such as "CLEAR_META" that clears the data in the buffer. In an embodiment, the buffer may include data from another write. In this embodiment, the data being written is appended to the end of the data already in the buffer. In an embodiment, the "PRESERVE-META" command may be in the form of generated journal data, including, but not limited to creat( ), mkdir( ), unlink( ), rename( ), chmod( ), close( ), setxatter( ), removexattr( ), utime( ), utimes( ), and Add Extend to the file.

Tape program 112 determines if a forced termination occurs (decision step 206). At decision step 206, tape program 112 determines whether a force termination has occurred of the writing of the data to the tape. For example, has a forced termination occurred of the writing of data to a tape in tape drive 122? In an embedment, a forced termination can be at least the following: the reservation on the tape is released (both normal release and forced release), the tape drive accepts a reboot request (e.g., a long press of the press eject button), or the tape drive accepts the unload request. In an embodiment, the unload request may be an unload command received by tape program 112 or an unload request received by media library 120, irrespective of whether the application sets the tape drive to prohibit unloading of a tape. If a forced termination occurs (decision step 206, yes branch), then processing proceeds to step 212.

If a forced termination did not occur (decisions step 206, no branch), then processing proceeds to step 208.

Tape program 112 determines if the write is completed (decision step 208). At decision step 208, tape program 112 determines whether the data being written has been completely written to the tape. In other words, as described above, has both the data partition and the index partition been written to the tape, indicating that the write of the data is completely. If the write is complete (decision step 208, yes branch), then processing proceeds to step 210. If the write has not been completed (decisions step 208, no branch), then processing proceeds to step 204.

Tape program 112 clears metadata (step 210). At step 210, tape program 112 issues a command that clears the data in the tape drive buffer. In an embodiment, the command may be "CLEAR_META" that removes the data found in the buffer of the tape drive that has data being written to the tape found in that tape drive. In an embodiment, the command may not clear the data in the buffer, but the command may allow other commands to write over the data found in the buffer with new and/or different data.

Tape program 112 preserves metadata (step 212). At step 212, tape program 112 issues a command that protected the data in the tape drive buffer from being edited, modified, deleted, and/or overwritten. In an embodiment, the command may be "PRESERVE_META" that protects the data found in the buffer of the tape drive from being formatted in any way, including, but not limited to, edited, deleted, removed, overwritten, or modified.

Figure 3:
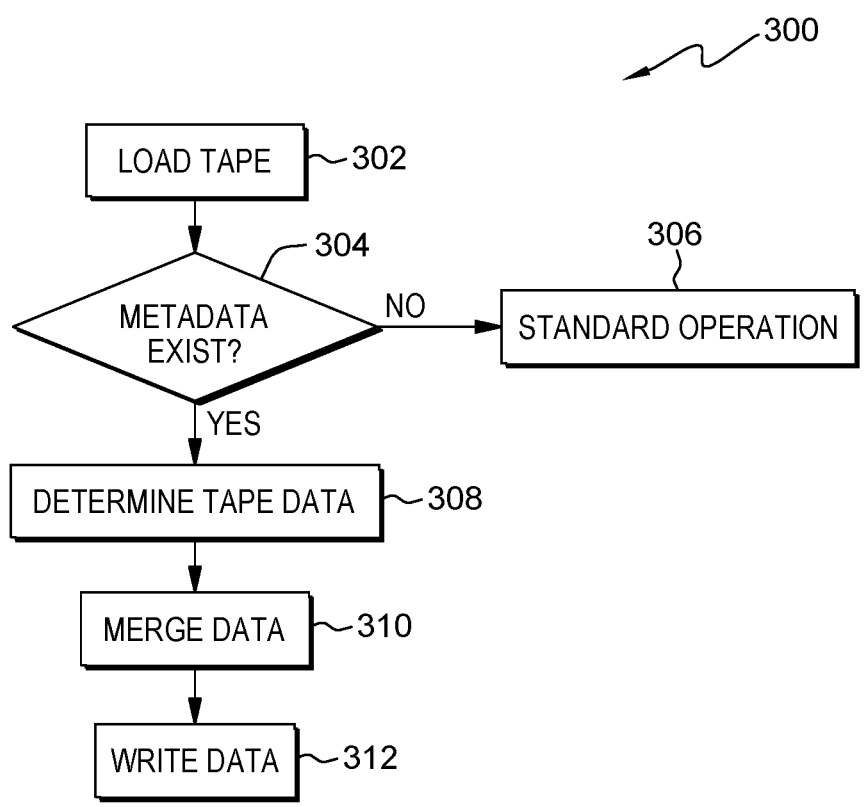
FIG. 3 is a flow chart diagram depicting operational steps for tape program 112, in accordance with at least one embodiment of the invention.

FIG. 3 is a flow chart diagram of workflow 300 depicting operational steps for tape program 112 in accordance with at least one embodiment of the invention. In an alternative embodiment, the steps of workflow 300 may be performed by any other program while working with tape program 112. It should be appreciated that embodiments of the present invention provide at least for interacting with a tape drive, including but not limited to, writing index partition and data partition information. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via user interface (not shown) of either host 140, host 142, or computer device 110, can invoke workflow 300 upon a tape being loaded into a tape drive of media library 120 of computing device 110.

Tape program 112 loads a tape (step 302). At step 302 tape program 112 receives an indication from media library 120 that a tape has been loaded into any of drive 122, 124, 126, 128. In an embodiment, the indication may be of a tape that is being loaded after a different tape had been loaded into the same drive. In an alternative embodiment, the indication may be of a tape that was unloaded then loaded again into the same tape drive. In yet another alternative embodiment, the indication may be of a tape that has remained in the tape drive, but the tape drive has accepted a reboot request. In yet another alternative embodiment, the indication may be of a tape that has its reservation released (either forced or normal release).

Tape program 112 determines if metadata exists (decision step 304). At step 304, tape program 112 determines if metadata exists in the buffer of the tape drive the tape has been loaded into in step 302. In other words, tape program 112 determines if any metadata exists in the buffer of the tape drive that may have been from previous tapes loaded into the tape drive. In an embodiment, the previous tape may be the same tape that is loaded into the tape drive currently. If metadata does not exist in the buffer of the tape drive (decision step 304, no branch), processing proceeds to step 306. If metadata exists in the buffer of the tape drive (decisions step 304, yes branch), processing proceeds to step 308.

Tape program 112 proceeds with standard operation (step 306). At step 306, tape program 112 has determine no metadata exists in the tape drive that has a tape loaded into it and therefore tape program 112 continues standard operation for loading a tape into a tape drive. For example, tape program 112 may write, read, edit, and/or modify data found on tape drive. In an embedment, tape program 112 may invoke workflow 200.

Tape program 112 determines tape data (step 308). At step 308, tape program 112 determines the last data written to the tape found on the tape loaded into the tape drive in step 302. In other words, tape program 112 determines the last data partition and/or index partition that has been written to the tape found on the tape loaded into the tape drive in step 302. In an embodiment, this may be the last piece of data written to the tape. In an alternative embodiment, this may be a last set of data written to the tape. In yet another alternative embodiment, this may be the last set of data up to the last index partition written on the tape. In yet another embodiment, this may be the journal entry information written in step 204.

Tape program 112 merges data (step 310). At step 310, tape program 112 takes the data found in the memory buffer of the tape drive and writes it to the end of the data found on the tape loaded in the tape drive. In this embodiment, the memory stored in the memory buffer of the tape drive is used to continue the writing to the tape drive that ended due to a forced termination such as in decision step 206. For example, the journal data and the latest index are merged from the memory buffer of the tape drive to the tape.

Tape program 112 writes data (step 312). At step 312, tape program 112 has completed writing the data that was in the memory buffer of the tape drive to the tape and now tape program 112 continues standard data. In other words, tape program 112 writes the data to the tape in the tape drive similar to step 204, discussed above. At step 312, tape program 112 will function similar to workflow 200.

Figure 4:
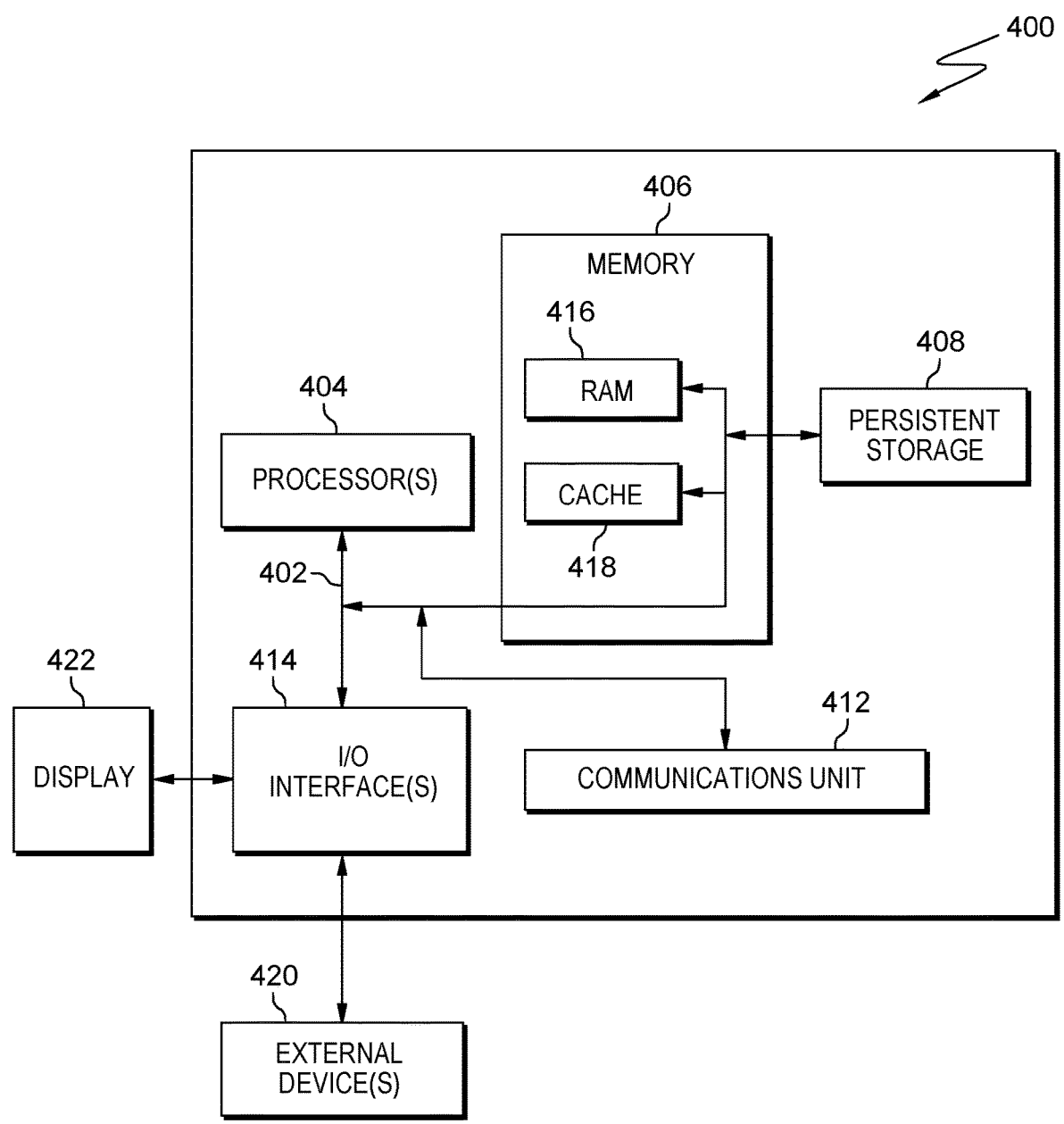
FIG. 4 is a block diagram depicting components of a computer, generally designated 400, suitable for executing vision program 116, in accordance with at least one embodiment of the invention.

FIG. 4 is a block diagram depicting components of a computer 400 suitable for tape program 112, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/ output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random-access memory (RAM) 416 and a cache 418. In general, the memory 406 may comprise any suitable volatile or non-volatile one or more computer readable storage media.

Program instructions tape program 112 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for preserving data in a linear tape file system (LTFS), the method comprising:

receiving, by one or more computer processors, a data to write to a tape in a LTFS;

writing, by one or more computer processors, the data to the tape;

receiving, by one or more computer processors, a forced termination of the write, wherein the forced termination is selected from the group consisting of reservation of the tape is normal released, reservation of the tape is forced release, a tape drive the tape is located receives a reboot request, or the tape drive the tape is located in receives an unload request; and responsive to receiving the forced termination, issuing, by one or more computer processors, a preserve metadata command.

2. The computer-implemented method of claim 1, wherein the step of writing the data to the tape comprises:
   writing, by one or more computer processors, a first partition of the data to a buffer of a tape drive;
   writing, by one or more computer processors, the first partition of the data from the buffer to the tape;
   responsive to the first partition of the data being written to the tape, writing, by one or more computer processors, a second partition of the data to the buffer;
   writing, by one or more computer processors, the second partition of the data from the buffer to the tape; and
   repeating the writing of data partitions of the data to the buffer and to the tape until the data has been written to the tape or the preserve metadata command has been issued.

3. The computer-implemented method of claim 2, wherein the preserve metadata command notifies the tape drive to preserve any data found in the buffer.

4. The computer-implemented method of claim 1, further comprising:
   receiving, by one or more computer processors, an indication of a tape being loaded to a tape drive;
   determining, by one or more computer processors, whether a metadata exists on the buffer of the tape drive;
   responsive to determining metadata exists on the buffer of the tape drive, determining, by one or more computer processors, whether the metadata is associated with the writing of the data to the tape; and
   responsive to determining the metadata is associated with the writing of the data to the tape, merging, by one or more computer processors, the metadata in the buffer with a remaining data to be written to the tape and completing the write of the data to the tape.

5. The computer-implemented method of claim 1, further comprising:
   determining, by one or more computer processors, that all of the data has been written to the tape; and
   responsive to determining that the data has been written to the tape, issuing, by one or more computer processors, a clear metadata command.

6. The computer-implemented method of claim 5, wherein the clear metadata command notifies a tape drive to clear any data found in a buffer of the tape drive.

7. A computer program product for preserving data in a linear tape file system (LTFS), the computer program product comprising:
   one or more computer readable storage media; and
   program instructions stored on the one or more computer readable storage media, the program instructions comprising:
      program instructions to receive a data to write to a tape in the LTFS;
      program instructions to write the data to the tape;
      program instructions to receive a forced termination of the write, wherein the forced termination is selected from the group consisting of reservation of the tape is normal released, reservation of the tape is forced release, a tape drive the tape is located receives a reboot request, or the tape drive the tape is located in receives an unload request; and
      responsive to receiving the forced termination, program instructions to issue a preserve metadata command.

8. The computer program product of claim 7, wherein the program instructions to write the data to the tape comprise:
   program instructions to write a first partition of the data to a buffer of a tape drive;
   program instructions to write the first partition of the data from the buffer to the tape;
   responsive to the first partition of the data being written to the tape, program instructions to write a second partition of the data to the buffer;
   program instructions to write the second partition of the data from the buffer to the tape; and
   program instructions to repeat the writing of data partitions of the data to the buffer and to the tape until the data has been written to the tape or the preserve metadata command has been issued.

9. The computer program product of claim 8, wherein the preserve metadata command notifies the tape drive to preserve any data found in the buffer.

10. The computer program product of claim 7, further comprising program instructions, stored on the one or more computer readable storage media, to:
   receive an indication of a tape being loaded to a tape drive;
   determine whether a metadata exists on the buffer of the tape drive;
   responsive to determining metadata exists on the buffer of the tape drive, determine whether the metadata is associated with the writing of the data to the tape; and
   responsive to determining the metadata is associated with the writing of the data to the tape, merge the metadata in the buffer with a remaining data to be written to the tape and completing the write of the data to the tape.

11. The computer program product of claim 7, further comprising program instructions, stored on the one or more computer readable storage media, to:
   determine that the data has been written to the tape; and
   responsive to determining that all of the data has been written to the tape, issue a clear metadata command.

12. The computer program product of claim 11, wherein the clear metadata command notifies a tape drive to clear any data found in a buffer of the tape drive.

13. A computer system for preserving data in a linear tape file system (LTFS), the computer system comprising:
   one or more computer processors;
   one or more computer readable storage media; and
   program instructions stored on the one or more computer readable storage media for execution by at least one of the one or more computer processors, the program instructions comprising:
      program instructions to receive a data to write to a tape in the LTFS;
      program instructions to write the data to the tape;
      program instructions to receive a forced termination of the write, wherein the forced termination is selected from the group consisting of reservation of the tape is normal released, reservation of the tape is forced release, a tape drive the tape is located receives a reboot request, or the tape drive the tape is located in receives an unload request; and
      responsive to receiving the forced termination, program instructions to issue a preserve metadata command.

14. The computer system of claim 13, wherein the program instructions to write the data to the tape comprise:
  program instructions to write a first partition of the data to a buffer of a tape drive;
  program instructions to write the first partition of the data from the buffer to the tape;
  responsive to the first partition of the data being written to the tape, program instructions to write a second partition of the data to the buffer;
  program instructions to write the second partition of the data from the buffer to the tape; and
  program instructions to repeat the writing of data partitions of the data to the buffer and to the tape until the data has been written to the tape or the preserve metadata command has been issued.

15. The computer system of claim 14, wherein the preserve metadata command notifies the tape drive to preserve any data found in the buffer.

16. The computer system of claim 13, further comprising program instructions, stored on the one or more computer readable storage media for execution by at least one of the one or more computer processors, to:
  receive an indication of a tape being loaded to a tape drive;
  determine whether a metadata exists on the buffer of the tape drive;
  responsive to determining metadata exists on the buffer of the tape drive, determine whether the metadata is associated with the writing of the data to the tape; and
  responsive to determining the metadata is associated with the writing of the data to the tape, merge the metadata in the buffer with a remaining data to be written to the tape and completing the write of the data to the tape.

17. The computer system of claim 13, further comprising program instructions, stored on the one or more computer readable storage media for execution by at least one of the one or more computer processors, to:
  determine that the data has been written to the tape; and
  responsive to determining that all of the data has been written to the tape, issue a clear metadata command.

* * * * *